(12) United States Patent
Richter et al.

(10) Patent No.: US 9,759,910 B2
(45) Date of Patent: Sep. 12, 2017

(54) OPTICAL SCANNING DEVICE

(75) Inventors: Stefan Richter, Jena (DE); Enrico Geissler, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 254 days.

(21) Appl. No.: 13/808,366

(22) PCT Filed: Jun. 30, 2011

(86) PCT No.: PCT/EP2011/003241
§ 371 (c)(1),
(2), (4) Date: Jan. 4, 2013

(87) PCT Pub. No.: WO2012/003938
PCT Pub. Date: Jan. 12, 2012

(65) Prior Publication Data
US 2013/0107338 A1 May 2, 2013

(30) Foreign Application Priority Data
Jul. 7, 2010 (DE) .................. 10 2010 026 571

(51) Int. Cl.
G02B 26/08 (2006.01)
G02B 26/10 (2006.01)
G02B 21/00 (2006.01)

(52) U.S. Cl.
CPC ....... G02B 26/101 (2013.01); G02B 21/0048 (2013.01); G02B 26/085 (2013.01); G02B 26/0841 (2013.01); G02B 26/0858 (2013.01)

(58) Field of Classification Search
CPC .............. G02B 26/101; G02B 26/0858; G02B 26/105; G02B 26/085; G02B 26/0833; G02B 26/0841; G02B 26/08; G02B 26/10
(Continued)

(56) References Cited

U.S. PATENT DOCUMENTS 6,172,789 B1 1/2001 Kino et al.
6,580,554 B2 6/2003 Engelhardt et al.
(Continued)

FOREIGN PATENT DOCUMENTS

EP 1410047 4/2004
EP 1 895 347 3/2008
JP 2000-310743 11/2000
(Continued)

OTHER PUBLICATIONS

Notification of Translation of the International Preliminary Report on Patentability dated Jan. 17, 2013, International Bureau of WIPO, Switzerland.
(Continued)

*Primary Examiner* — James Phan
(74) *Attorney, Agent, or Firm* — Haug Partners LLP

(57) ABSTRACT

The invention is directed to an optical scanning device with two scanning mirrors and with optical elements for imaging the two scanning mirrors one onto the other by means of an intermediate image. A control unit is provided for supplying drives which are coupled to the scanning mirrors with excitation voltages or excitation currents to initiate deflection angles ranging from zero to the maximum possible deflection angle for the two scanning mirrors. At least one of the scanning mirrors is designed for biaxial scanning, and the control unit is designed to vary the driving of the two scanning mirrors with respect to biaxial or uniaxial deflection of the beam bundle electively in quasistatic or resonant mode of operation. At least one of the two scanning mirrors is preferably designed as MEMS assembly.

16 Claims, 4 Drawing Sheets

(58) Field of Classification Search
USPC .......................................... 359/201.1–202.1
See application file for complete search history.

(56) References Cited

U.S. PATENT DOCUMENTS

| | | | |
|---|---|---|---|
| 7,078,778 | B2 | 7/2006 | Schenk |
| 7,295,726 | B1 | 11/2007 | Milanovic et al. |
| 2002/0041439 | A1* | 4/2002 | Engelhardt et al. .......... 359/368 |
| 2008/0186551 | A1 | 8/2008 | Hanft et al. |
| 2009/0174935 | A1 | 7/2009 | Szulczewski et al. |

FOREIGN PATENT DOCUMENTS

| | | |
|---|---|---|
| JP | 2002-079393 | 3/2002 |
| JP | 2002-196249 | 7/2002 |
| JP | 2008-534993 | 8/2008 |
| JP | 2009-080154 | 4/2009 |
| JP | 2009-505159 | 5/2009 |
| JP | 2009-258645 | 11/2009 |
| JP | 2010-501354 | 1/2010 |
| WO | WO 90/00755 | 1/1990 |
| WO | WO 2007/022237 | 2/2007 |

OTHER PUBLICATIONS

International Search Report for Application No. PCT/EP2011/003241 dated Oct. 17, 2011.
Notification of Reasons for Rejection for JP Patent Application No. 2013-517084 dated Feb. 10, 2015.
Notification of Reasons for Rejection for JP Patent Application No. 2016-100486 dated Mar. 14, 2017.

* cited by examiner a)    b)

OPTICAL SCANNING DEVICE

The present application claims priority from PCT Patent Application No. PCT/EP2011/003241 filed on Jun. 30, 2011, which claims priority from German Patent Application No. DE 10 2010 026 571.3 filed on Jul. 7, 2010, the disclosures of which are incorporated herein by reference in their entirety.

FIELD OF THE INVENTION

The invention is directed to an optical scanning device with two scanning mirrors and with optical elements for imaging the two scanning mirrors one onto the other by means of an intermediate image.

It is noted that citation or identification of any document in this application is not an admission that such document is available as prior art to the present invention.

The laser scanning devices known from the prior art such as are used, for example, in laser scanning microscopes or ophthalmic instruments usually include two uniaxial scanning mirrors successively arranged in the beam path which pivot around orthogonally aligned deflection axes to allow biaxial scanning. These scanning mirrors are typically constructed as galvanometer mirrors or polygon mirrors.

When used in an optical imaging system, imaging is optimal for only one of the two scanning mirrors because they are not both in the same plane. It is also known to image a plane between the scanners; however, the imaging of the two scanning mirrors is blurred.

Therefore, in order to prevent a variation in intensity of the laser spot due to the movement of the imaging pupil, the pupil must be overfilled. However, this causes a loss of light or a loss of intensity in the rest of the imaging system.

Optical elements for generating an intermediate image can be provided between two uniaxial scanning mirrors so that an image of the first scanning mirror is formed on the second scanning mirror. The plane of the second scanning mirror is then imaged in the rest of the imaging beam path. An imaging system of this kind is described in connection with microscope applications in WO 90/00755.

This has the substantial disadvantage of a relatively large space requirement because the intermediate image is carried out by reflective elements in order to avoid chromatic aberrations due to the dispersion of refractive elements. This drawback limits applicability to stationary applications.

In contrast, a beam bundle can advantageously be deflected in the same plane biaxially, i.e., by both orthogonal axes, with only one micro-electromechanical scanning mirror, known as MEMS. In order to achieve a sufficiently large deflection angle with sufficiently high positioning accuracy and positioning speed at low drive voltages or drive currents, MEMS scanning mirrors are often moved by electrostatic comb drives.

In this case, the two driving combs required for biaxial deflection are aligned with respect to one another in such a way that, in two different modes of operation, either the scanning mirror is excited to resonant oscillation or the scanning mirror is exactly positioned quasistatically as is described, for example, in U.S. Pat. No. 7,295,726 B1, EP 1410047 B1 or U.S. Pat. No. 7,078,778 B2.

Alternative drive concepts include electromagnetic drives or piezoelectric drives.

However, all of the drive concepts mentioned above have in common that they are vibratory mechanical systems, known as spring-mass systems, which have at least one resonant frequency. In order to achieve a particular deflection angle in this case, for quasistatic operation this must be accomplished already in static positioning. This is generally accomplished by a corresponding dimensioning of the spring joints which are responsible for the return force and which give the resonant frequency at a given drive torque and moment of inertia.

If the deflection angle is to be achieved only at the resonant frequency, the resonance elevation in amplitude in the frequency response is used. In so doing, the restoring force can be made appreciably higher selectively by means of stiffer spring joints so that the resonant frequency is also appreciably higher compared to quasistatic operation at a given deflection angle. In this case, the deflection angle is only achieved as a maximum amplitude of a harmonic oscillation.

Therefore, there are two fundamentally different modes of operation: a quasistatic mode of operation for free positioning and a resonant mode of operation for fast scanning with a harmonic oscillation.

While uniaxial galvanometer scanners are also operated in both of these modes, a restoring force is provided by a spring in this case only in the resonant mode.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

On this basis, it is the object of the invention to develop a scanning device of the type mentioned above in such a way that both operating modes are made possible with sufficiently large deflection angles, sufficiently high positioning accuracy and sufficiently high positioning speed so as to achieve an optimal imaging quality in line with the highest standards.

This object is met according to the invention by an optical scanning device comprising:
 a first scanning mirror for deflecting a beam bundle,
 a second scanning mirror which is positioned in direction of the deflected beam bundle for deflecting the beam bundle again,
 optical means which are arranged between the two scanning mirrors and are designed for imaging the first scanning mirror on the second scanning mirror via an intermediate image, and
 a control unit for supplying scanning mirror drives with given excitation voltages or excitation currents to bring about a biaxial or uniaxial deflection of the beam bundle by deflection angles ranging from zero degrees to the maximum possible deflection angle electively in quasistatic operating mode or resonant operating mode, wherein at least one of the scanning mirrors is formed as a biaxial scanning mirror.

Because of the imaging of the first scanning mirror on the second scanning mirror, the sequence of these scanning mirrors is interchangeable so that the embodiment forms of the invention described in the following will also function with the scanning mirrors in reverse order.

In a preferred embodiment form, the two scanning mirrors are deflected biaxially, and a resonant mode of operation is provided for the first scanning mirror in the direction of the beam bundle and a quasistatic mode of operation is provided for the second scanning mirror following the first scanning mirror.

For this purpose, the first scanning mirror can be provided for generating Lissajous patterns and the second scanning mirror can be provided for quasistatic transfer of these patterns to a larger scan field composed of a plurality of smaller scan fields.

In a further embodiment form, the two scanning mirrors are deflected biaxially, and a quasistatic operating mode is provided for both scanning mirrors.

In this way, a larger scan field made up of the scan fields of both scanning mirrors is generated. This is advantageous especially when one of the two scanning mirrors can accommodate a large scan field, but is slow. The other scanning mirror uses a smaller scan field, but is faster.

In the following embodiment form, both scanning mirrors are deflected biaxially, and for the first scanning mirror in the direction of the beam bundle a resonant operating mode is provided with respect to a first deflection axis and a quasistatic operating mode is provided with respect to the deflection angle orthogonal to the first deflection angle, while a biaxial quasistatic operation is provided for the second scanning mirror.

Accordingly, the second scanning mirror can be used for quasistatic positioning of scan patterns, such as line patterns or meander patterns, on a scan field.

In another embodiment form, one scanning mirror is deflected biaxially and the other scanning mirror is deflected uniaxially, a quasistatic operating mode is provided for the biaxial scanning mirror and a resonant operating mode is provided for the uniaxial scanning mirror.

In so doing, a uniaxial deflection can be provided for the first scanning mirror in direction of the beam bundle in resonant operating mode and a biaxial deflection can be provided for the second scanning mirror in quasistatic operating mode. This embodiment form is preferably usable for quasistatic positioning of a laser spot on a scan field or for executing raster patterns or meander patterns.

In the following embodiment form, both scanning mirrors are deflected biaxially, a resonant operating mode is provided in each scanning mirror with respect to a first deflection axis and a quasistatic operating mode is provided in each scanning mirror with respect to the deflection axis orthogonal to the first deflection axis.

The scanning mirrors are arranged in such a way that the resonant axis of the first scanning mirror is imaged on the quasistatic axis of the second scanning mirror, and the quasistatic axis of the first scanning mirror is imaged on the resonant axis of the second scanning mirror. In this way, with respect to the resulting axes of the scan field there is both a quasistatic axis and a resonant axis.

This advantageously allows a quasistatic positioning of a laser spot on a scan field or execution of Lissajous patterns, raster patterns or meander patterns as well as composites thereof.

Advantageously in all the above-mentioned embodiment forms, at least one of the two scanning mirrors is formed as a MEMS assembly or MEMS scanning mirror.

The drives connected to the scanning mirrors are preferably formed as electrostatic drives. Alternative drive concepts can include electromagnetic actuators in the form of moving permanent magnets or moving coils or voice coils with static permanent magnets, or piezoelectric actuators.

The optical means for imaging the one scanning mirror on the other scanning mirror include refractive optical elements, reflective optical elements, diffractive optical elements, or combinations of refractive, reflective, and diffractive optical elements. To avoid chromatic aberrations, reflective optical elements are preferably provided.

The control unit is designed particularly for:
- separate or collective synchronized control of the scanning mirrors,
- switching the individual modes of operation to be provided for the respective scanning mirror,
- setting the deflection angles and/or
- biaxial or uniaxial deflection.

The corresponding control commands are generated in the control unit in response to manually entered commands, by a control circuit, or depending on the results of electronic image evaluation.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
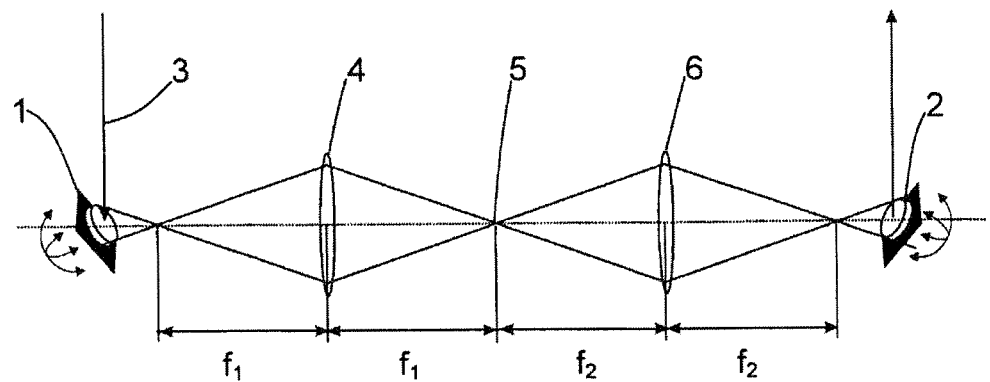
FIG. 1 shows the principle of the optical scanning device according to the invention with two biaxially deflectable MEMS scanning mirrors which are imaged on one another by means of refractive optical elements via an intermediate image.

FIG. 1 shows the principle of the optical scanning device according to the invention with two biaxially deflectable MEMS scanning mirrors 1 and 2. A beam bundle 3, for example, a laser beam, impinges on the first MEMS scanning mirror 1 which is deflected electively uniaxially or biaxially, resonantly or quasistatically. In so doing, the pattern generated by the MEMS scanning mirror 1 is imaged on the second MEMS scanning mirror 2 via lens 4, intermediate image 5, and lens 6. The imaging of one MEMS scanning mirror 1, 2 on the other is carried out, for example, as is shown, by means of a 4f system.

A control unit, not shown in the drawing, is provided. It is designed for varying the deflection of the beam bundle 3 and for specifying quasistatic or resonant modes of operations of the two MEMS scanning mirrors 1, 2.

The scanning device according to the invention can preferably be part of an optical system for obtaining images of specimens designed, for example, as a subassembly of a laser scanning microscope.

Figure 2:
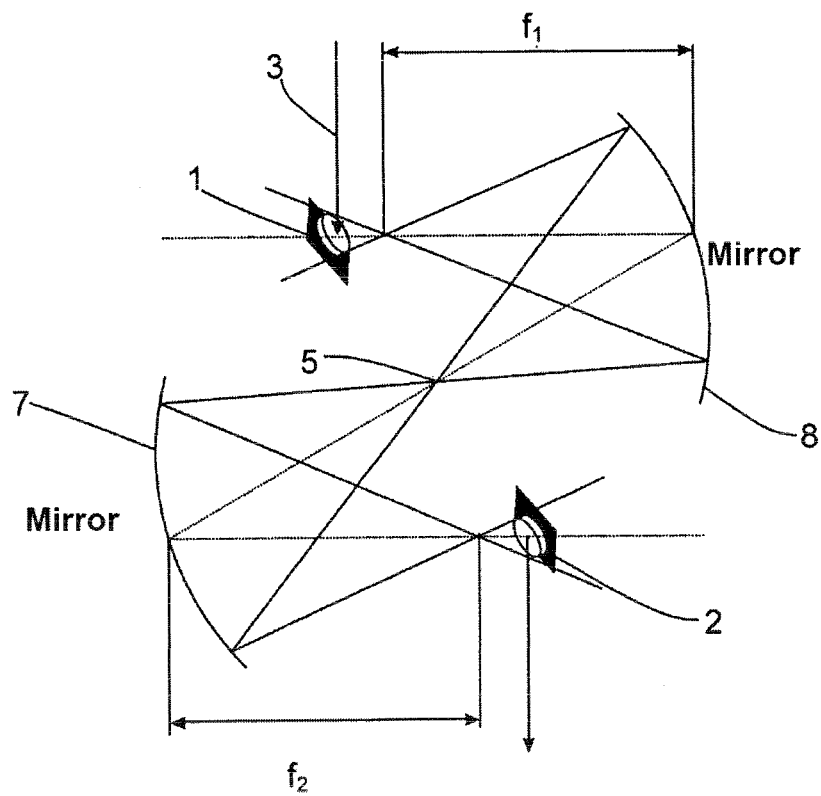
FIG. 2 shows the principle of the optical scanning device according to FIG. 1, wherein reflective optical elements are provided for generating the intermediate image.

The principle of the optical scanning device shown in FIG. 2 corresponds to that of FIG. 1, except that reflective optical elements 6, 7 are provided for generating the intermediate image 5.

Figure 3:
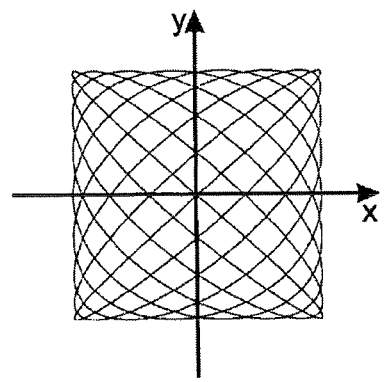
FIG. 3 shows an example of an image generated by the scanning device according to the invention, wherein both MEMS scanning mirrors are deflected uniaxially with orthogonal deflection axes and in resonant operation.

In the example shown in FIG. 3, as can be seen, biaxial scanning of a Lissajous pattern is possible depending on the resonant frequency and relative phase thereof.

Figure 4:
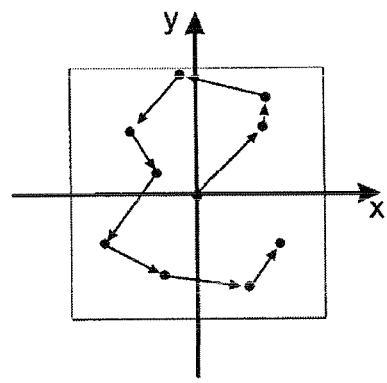
FIG. 4 shows an example of an image generated by the scanning device according to the invention, wherein both MEMS scanning mirrors are deflected uniaxially with orthogonal deflection axes and in quasistatic operation.

The embodiment and the control according to FIG. 4, as exemplified here, allows biaxial quasistatic positioning of a laser spot.

Figure 5:
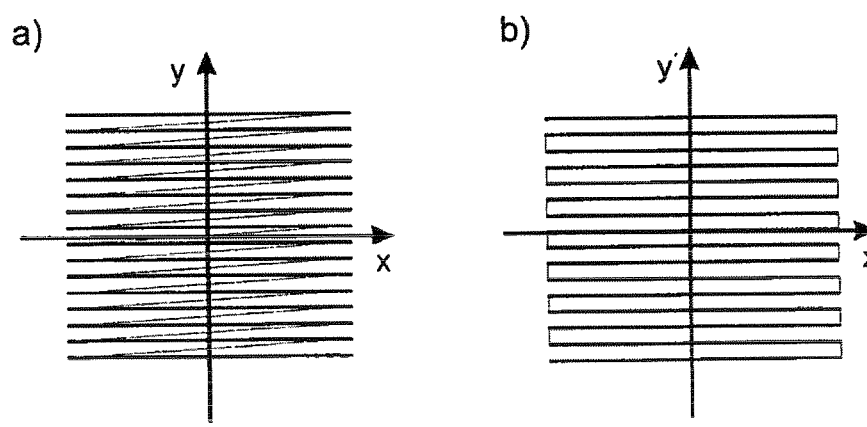
FIG. 5 shows an example of an image generated by the scanning device according to the invention, wherein both MEMS scanning mirrors are deflected uniaxially with orthogonal deflection axes, and with one of the MEMS scanning mirrors in quasistatic operation and the other MEMS scanning mirror in resonant operation.

FIG. 5a and FIG. 5b show by way of example the possibility of scanning raster patterns or meander patterns using a uniaxial quasistatic scanning mirror and a uniaxial resonant scanning mirror.

Figure 6:
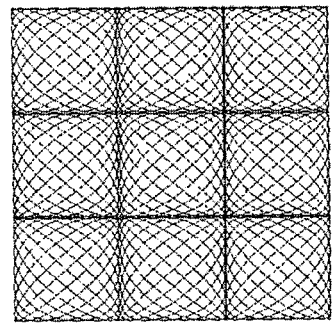
FIG. 6 shows an example of an image generated by the scanning device according to the invention, wherein both MEMS scanning mirrors are deflected biaxially and a resonant operation is provided for one MEMS scanning mirror and a quasistatic operation is provided for the other MEMS scanning mirror.

It can be seen from the example shown in FIG. 6 how the first MEMS scanning mirror 1 can be used for generating Lissajous patterns, while the second MEMS scanning mirror 2 is used for quasistatic transfer of these patterns to a larger scan field composed of a plurality of smaller scan fields.

Figure 7:
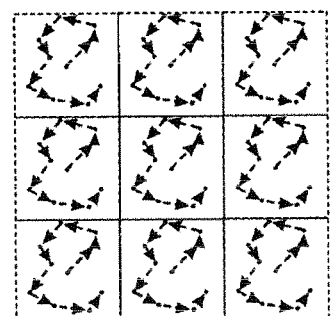
FIG. 7 shows an example of an image generated by the scanning device according to the invention, wherein both MEMS scanning mirrors are deflected biaxially and a quasistatic operation is provided for both MEMS scanning mirrors.

In the example shown in FIG. 7, the first scanning mirror 1 can be used for positioning a laser spot within the scan field of scanning mirror 1, and the second scanning mirror 2 can be used for quasistatic positioning of the scan field of scanning mirror 1 and, therefore, for expanding to a larger scan field resulting from the scan fields of both MEMS scanning mirrors 1, 2.

Figure 8:
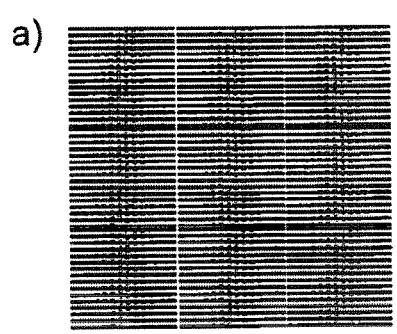
FIG. 8 shows an example of an image generated by the scanning device according to the invention, wherein both MEMS scanning mirrors are deflected biaxially, and for one MEMS scanning mirror a resonant operating mode is provided with respect to a first deflection axis and a quasistatic operating mode is provided with respect to a deflection axis orthogonal to the first deflection angle, while the second MEMS scanning mirror is operated quasistatically.
Figure 8:
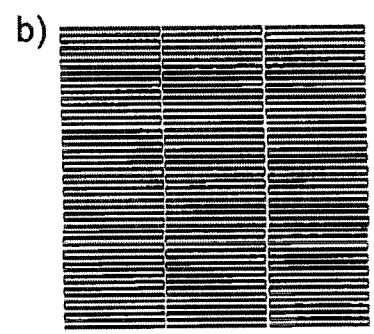

FIG. 8a and FIG. 8b show examples in which the second scanning mirror 2 is used for quasistatic positioning of raster patterns or meander patterns which are generated by scanning mirror 1 with a resonant axis and a quasistatic axis.

Figure 9:
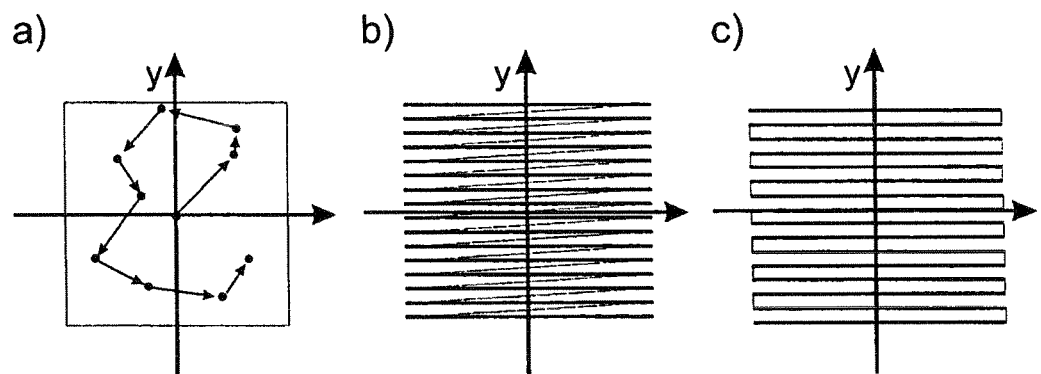
FIG. 9 shows an example of an image generated by the scanning device according to the invention, wherein one MEMS scanning mirror is deflected biaxially and the other MEMS scanning mirror is deflected uniaxially, a quasistatic operating mode is provided for the biaxial MEMS scanning mirror, and a resonant operating mode is provided for the uniaxial MEMS scanning mirror.
Figure 10:
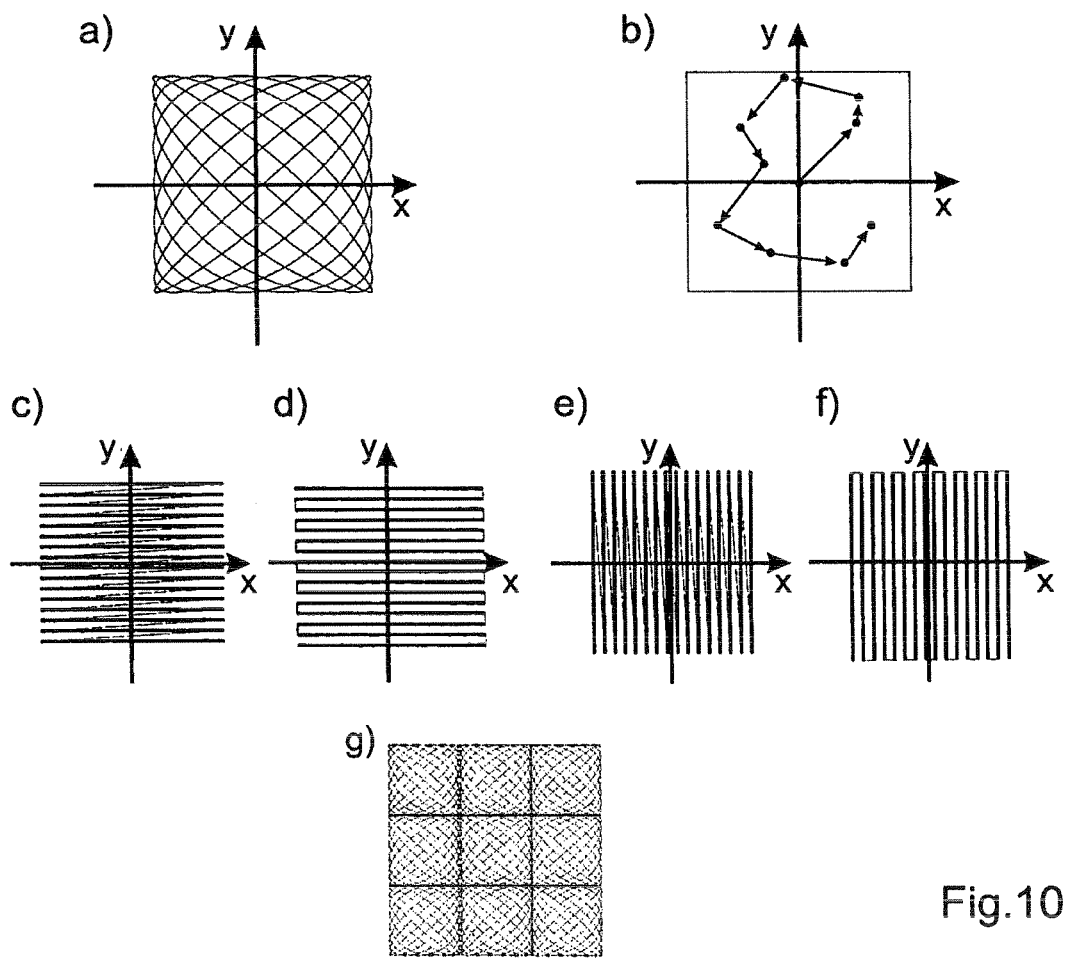
FIG. 10 shows an example of an image generated by the scanning device according to the invention, wherein both MEMS scanning mirrors are deflected biaxially, a resonant operating mode is provided for each MEMS scanning mirror with respect to a first deflection axis and a quasistatic operating mode is provided for each MEMS scanning mirror with respect to a deflection axis orthogonal to the first deflection axis.

The example shown in FIG. 9a to FIG. 9c is preferably suitable for quasistatic positioning of a laser spot on a scan field or for executing raster patterns or meander patterns. In this regard, a uniaxial deflection in resonant operating mode is provided for the first MEMS scanning mirror 1 with respect to the direction of the beam bundle 3 and a biaxial deflection in quasistatic operating mode is provided for the second MEMS scanning mirror 2.

FIGS. 10a to 10g show examples in which a Lissajous pattern, a quasistatic positioning of scan patterns on a scan field, or the execution of raster patterns or meander patterns is provided. In this case, both MEMS scanning mirrors are deflected biaxially and, for each of the MEMS scanning mirrors, a resonant operating mode is provided with respect to a first deflection axis and a quasistatic operating mode is provided with respect to a deflection axis orthogonal to the first deflection axis.

The scanning mirrors are arranged in such a way that the resonant axis of the first scanner is imaged on the quasistatic axis of the second scanner, and the quasistatic axis of the first scanner is imaged on the resonant axis of the second scanner. In this way, with respect to the resulting axes of the scan field, there is a quasistatic axis as well as a resonant axis in each instance.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

REFERENCE NUMERALS

1 MEMS scanning mirror
2 MEMS scanning mirror
3 beam bundle
4 lens
5 intermediate image
6 lens
7 reflective element
8 reflective element

The invention claimed is:

1. An optical scanning device comprising:
a first scanning mirror which is configured to deflect a beam bundle, and which is driven by a first scanning mirror drive;
a second scanning mirror which is positioned in direction of the deflected beam bundle, and is configured to deflect the beam bundle again, the second scanning mirror being driven by a second scanning mirror drive;
optical means which are arranged between the two scanning mirrors and are configured to image the first scanning mirror on the second scanning mirror via an intermediate image; and
a control unit configured to supply the scanning mirror drives with given excitation voltages or excitation currents to bring about a biaxial or uniaxial deflection of the beam bundle by deflection angles ranging from zero degrees to the maximum possible deflection angle electively in quasistatic operating mode or resonant operating mode;
wherein at least one of the scanning mirrors is formed as a biaxial scanning mirror; and
wherein the first scanning mirror and the second scanning mirror are arranged in such a way that the resonant axis of the first scanning mirror is imaged on the quasistatic axis of the second scanning mirror, and the quasistatic axis of the first scanning mirror is imaged on the resonant axis of the second scanning mirror.

2. The optical scanning device according to claim 1;
wherein the two scanning mirrors are deflected biaxially;
wherein a resonant mode of operation is provided for the first scanning mirror in the direction of the beam bundle; and
wherein a quasistatic mode of operation is provided for the second scanning mirror.

3. The optical scanning device according to claim 1;
wherein one scanning mirror is deflected biaxially and the other scanning mirror is deflected uniaxially;
wherein a quasistatic operating mode is provided for the biaxial scanning mirror; and
wherein a resonant operating mode is provided for the uniaxial scanning mirror.

4. The optical scanning device according to claim 3;
wherein a uniaxial deflection is provided for the first scanning mirror in resonant operating mode; and
wherein a biaxial deflection is provided for the second scanning mirror in quasistatic operating mode.

5. The optical scanning device according to claim 1;
wherein both scanning mirrors are deflected biaxially;
wherein a resonant operating mode is provided in each of the two scanning mirrors with respect to a first deflection axis; and
wherein a quasistatic operating mode is provided in each of the two scanning mirrors with respect to a deflection axis orthogonal to the first deflection axis.

6. The optical scanning device according to claim 5;
wherein a quasistatic positioning of a laser spot on a scan field, or the execution of Lissajous patterns, raster patterns, meander patterns, or composites thereof are provided.

7. The optical scanning device according to claim 1;
wherein at least one of the two scanning mirrors is formed as a MEMS assembly.

8. The optical scanning device according to claim 1;
wherein the scanning mirror drives connected to the scanning mirrors are formed as electrostatic drives, electromagnetic actuators in the form of moving permanent magnets or moving coils, voice coils with static permanent magnets, or piezoelectric actuators.

9. The optical scanning device according to claim 1;
wherein the optical means for imaging the first scanning mirror on the second scanning mirror comprise refractive optical elements, reflective optical elements, diffractive optical elements, or combinations of refractive, reflective, and diffractive optical elements.

10. The optical scanning device according to claim 1;
wherein the control unit is configured to:
separately control the scanning mirrors or collectively synchronize control of the scanning mirrors;
switch the individual modes of operation provided for the respective scanning mirror;
set the deflection angles; and/or
enable biaxial or uniaxial deflection.

11. The optical scanning device according to claim 10;
wherein control commands are generated by means of the control unit in response to manually entered commands, or by a control circuit, or the control commands are generated depending on the results of electronic image evaluation.

12. An optical scanning device comprising:
a first scanning mirror which is configured to deflect a beam bundle, and which is driven by a first scanning mirror drive;
a second scanning mirror which is positioned in direction of the deflected beam bundle, and is configured to deflect the beam bundle again, the second scanning mirror being driven by a second scanning mirror drive;
optical means which are arranged between the two scanning mirrors and are configured to image the first scanning mirror on the second scanning mirror via an intermediate image; and
a control unit configured to supply the scanning mirror drives with given excitation voltages or excitation currents to bring about a biaxial or uniaxial deflection of the beam bundle by deflection angles ranging from zero degrees to the maximum possible deflection angle electively in quasistatic operating mode or resonant operating mode;
wherein the two scanning mirrors are deflected biaxially;
wherein a resonant mode of operation is provided for the first scanning mirror in the direction of the beam bundle;
wherein a quasistatic mode of operation is provided for the second scanning mirror; and
wherein the first scanning mirror is provided for generating Lissajous patterns; and
wherein the second scanning mirror is provided for quasistatic transfer of the generated Lissajous patterns to a larger scan field composed of a plurality of smaller scan fields.

13. An optical scanning device comprising:
a first scanning mirror which is configured to deflect a beam bundle, and which is driven by a first scanning mirror drive;
a second scanning mirror which is positioned in direction of the deflected beam bundle, and is configured to deflect the beam bundle again, the second scanning mirror being driven by a second scanning mirror drive;
optical means which are arranged between the two scanning mirrors and are configured to image the first scanning mirror on the second scanning mirror via an intermediate image; and
a control unit configured to supply the scanning mirror drives with given excitation voltages or excitation currents to bring about a biaxial or uniaxial deflection of the beam bundle by deflection angles ranging from zero degrees to the maximum possible deflection angle electively in quasistatic operating mode or resonant operating mode;

wherein both scanning mirrors are deflected biaxially; and wherein a quasistatic operating mode is provided for both scanning mirrors.

14. The optical scanning device according to claim 13;

wherein a larger scan field resulting from the scan fields of both scanning mirrors is generated.

15. An optical scanning device comprising:

a first scanning mirror which is configured to deflect a beam bundle, and which is driven by a first scanning mirror drive;

a second scanning mirror which is positioned in direction of the deflected beam bundle, and is configured to deflect the beam bundle again, the second scanning mirror being driven by a second scanning mirror drive;

optical means which are arranged between the two scanning mirrors and are configured to image the first scanning mirror on the second scanning mirror via an intermediate image; and a control unit configured to supply the scanning mirror drives with given excitation voltages or excitation currents to bring about a biaxial or uniaxial deflection of the beam bundle by deflection angles ranging from zero degrees to the maximum possible deflection angle electively in quasistatic operating mode or resonant operating mode;

wherein both scanning mirrors are deflected biaxially;

wherein, for the first scanning mirror in the direction of the beam bundle, a resonant operating mode is provided with respect to a first deflection axis, and a quasistatic operating mode is provided with respect to a deflection angle orthogonal to the first deflection angle; and a biaxial quasistatic operation is provided for the second scanning mirror.

16. The optical scanning device according to claim 15;

wherein the second scanning mirror is provided for quasistatic positioning of scan patternson a scan field.

* * * * *